(12) United States Patent  (10) Patent No.: US 12,400,769 B2
Ma et al.  (45) Date of Patent: Aug. 26, 2025

(54) RESIDUAL STRESS IMPROVEMENT METHOD AND RESIDUAL STRESS IMPROVEMENT APPARATUS

(71) Applicant: KANADEVIA CORPORATION, Osaka (JP)

(72) Inventors: Donghui Ma, Osaka (JP); Jun Okada, Osaka (JP); Masanori Goto, Osaka (JP)

(73) Assignee: KANADEVIA CORPORATION, Osaka (JP)

( * ) Notice: Subject to any disclaimer, the term of this patent is extended or adjusted under 35 U.S.C. 154(b) by 290 days.

(21) Appl. No.: 17/927,283

(22) PCT Filed: Mar. 3, 2021

(86) PCT No.: PCT/JP2021/008115
§ 371 (c)(1),
(2) Date: Nov. 22, 2022

(87) PCT Pub. No.: WO2021/240938
PCT Pub. Date: Dec. 2, 2021

(65) Prior Publication Data
US 2023/0207147 A1  Jun. 29, 2023

(30) Foreign Application Priority Data
May 27, 2020  (JP) .................................. 2020-092325

(51) Int. Cl.
*G21F 5/12* (2006.01)
*G21F 5/008* (2006.01)
*G21F 5/06* (2006.01)

(52) U.S. Cl.
CPC ................ *G21F 5/12* (2013.01); *G21F 5/008* (2013.01); *G21F 5/06* (2013.01)

(58) Field of Classification Search
CPC ... G21F 5/008; G21F 5/06; G21F 5/12; G21F 9/36; B23K 2101/12; C21D 7/06; B21D 31/06
See application file for complete search history.

(56) References Cited

U.S. PATENT DOCUMENTS 4,197,467 A * 4/1980 Williams .................. G21F 5/10
976/DIG. 344
5,553,106 A * 9/1996 Enomoto ............. G21C 13/087
134/108

(Continued)

FOREIGN PATENT DOCUMENTS

JP  6-79626 A  3/1994
JP  07-328860 A  12/1995

(Continued)

OTHER PUBLICATIONS

CN 103521919A, Luo et al. Jan. 2014.*

(Continued)

*Primary Examiner* — Edward T Tolan
(74) *Attorney, Agent, or Firm* — Pillsbury Winthrop Shaw Pittman, LLP

(57) ABSTRACT

A method of improving residual stress in a canister in which fuel assemblies are loaded includes, when the canister having a cylindrical canister shell and a canister lid welded to the upper opening of the canister shell is disposed in a cylindrical cask body, filling the space above and around an upper end portion of the canister in the cask body with fill water. Then, compressive stress is applied to a predetermined region of the upper end portion of the canister in the fill water. This makes it possible to readily apply compressive stress to the canister while shielding radioactive rays by the fill water.

6 Claims, 8 Drawing Sheets

(56) References Cited

U.S. PATENT DOCUMENTS

| | | | |
|---|---|---|---|
| 9,508,459 B2* | 11/2016 | Kitagawa | G21F 9/36 |
| 11,250,962 B1* | 2/2022 | Singh | G21F 5/008 |
| 2011/0005288 A1 | 1/2011 | Matsui et al. | |
| 2016/0240275 A1 | 8/2016 | Kitagawa et al. | |

FOREIGN PATENT DOCUMENTS

| | | | |
|---|---|---|---|
| JP | 2001-343490 A | 12/2001 | |
| JP | 2002-162391 A | 6/2002 | |
| JP | 2003-255082 A | 9/2003 | |
| JP | 5208064 B2 | 3/2013 | |
| JP | 2014-181978 A | 9/2014 | |
| JP | 6208962 B2 | 9/2017 | |

OTHER PUBLICATIONS

CN 109580342A, Peng et al. Apr. 2019.*
WO 97/39457A1, Jung et al. Oct. 1997.*
Search Report dated Apr. 27, 2021, issued in corresponding International Application No. PCT/JP2021/008115 with English translation (4 pgs.).
Written Opinion of the International Searching Authority dated Apr. 27, 2021, issued in corresponding International Application No. PCT/JP2021/008115 (4 pgs.).
International Preliminary Report on Patentability dated Nov. 17, 2022, issued in corresponding International Application No. PCT/JP2021/008115 with English translation (10 pgs.).

* cited by examiner

RESIDUAL STRESS IMPROVEMENT METHOD AND RESIDUAL STRESS IMPROVEMENT APPARATUS

CROSS-REFERENCE TO RELATED APPLICATIONS

This application is the U.S. National Stage of PCT/JP2021/008115, filed Mar. 3, 2021, which claims priority to Japanese Patent Application No. 2020-092325, filed May 27, 2020, the entire contents of both of which are herein incorporated by reference in their entireties.

TECHNICAL FIELD

The present invention relates to a technique for improving residual stress in a canister in which fuel assemblies are loaded.

CROSS-REFERENCE TO RELATED APPLICATIONS

This application claims priority benefit of Japanese Patent Application No. JP2020-092325 filed in the Japan Patent Office on May 27, 2020, the entire disclosure of which is incorporated herein by reference.

BACKGROUND ART

Spent fuel assemblies taken out of a nuclear reactor (hereinafter, simply referred to as "fuel assemblies") are temporarily stored in a storage pool in a building and then loaded in a storage canister. The canister that is housed in a transport cask is transported to a storage facility and rehoused in, for example, a concrete storage container.

Japanese Patent No. 6208962 (Document 1) discloses a technique for preventing stress-corrosion cracking in a canister. With this technique, residual tensile stress that occurs is cancelled by applying first compressive stress in advance to an area of a cylindrical shell (canister shell) in which residual tensile stress is expected to occur due to welding of a lid (canister lid) and, with residual compressive stress applied to this area, welding the canister lid to the canister shell. Thereafter, second compressive stress is applied to only the upper end of the canister shell and an axial area in the vicinity of the upper end, both of which become close to a melting state during welding.

Document 1 also discloses a technique for inserting the canister into a transport cask (cask body) and subjecting the canister shell to plastic working with use of an upper opening (ring-shaped gap) formed between the transport cask and the canister, and a technique for filling the upper opening with water and cooling welds with water during the welding of the canister lid so as to narrow the axial area in which residual tensile stress occurs after welding. Japanese Patent No. 5208064 (Document 2) describes a method of water-jet peening performed on a reactor core internal structure installed in a nuclear reactor pressure container.

In the case where compressive stress is applied to a canister that is disposed in a cylindrical cask body as in Document 1, it is not possible to shield radioactive rays coming from the inside of the canister toward the upper opening of the cask body. This increases the difficulty of the operation of applying compressive stress to the canister.

SUMMARY OF THE INVENTION

The present invention is intended for a residual stress improvement method of improving residual stress in a canister in which fuel assemblies are loaded, and it is an object of the present invention to readily apply compressive stress to the canister.

A preferable residual stress improvement method according to the present invention includes a) when a canister having a cylindrical canister shell and a canister lid welded to an upper opening of the canister shell is disposed in a cylindrical cask body, filling a space above and around an upper end portion of the canister in the cask body with fill water, and b) applying compressive stress to a predetermined region of the upper end portion of the canister in the fill water.

According to the present invention, it is possible to readily apply compressive stress to the canister while shielding radioactive rays by the fill water.

Preferably, in the operation b), water-jet peening is used to apply compressive stress to the predetermined region, the water-jet peening being performed by injecting water from a nozzle that is disposed in the fill water.

Preferably, an annular space is formed between an inner peripheral surface of the cask body and an outer peripheral surface of the canister and filled with water, and in the operation b), the water injected from the nozzle includes the water that has filled the annular space.

Preferably, the fill water in the operation a) and the water injected from the nozzle in the operation b) are clean water that contains no radioactive materials.

Preferably, in the operation a), a surface of water is formed in a ring-shaped weir that is attached to an upper portion of the cask body and projects upward therefrom.

Preferably, an annular space is formed between an inner peripheral surface of the cask body and an outer peripheral surface of the canister, and a width of the annular space around the upper end portion of the canister is greater than a width of the annular space around a central portion of the canister, and when the canister lid is welded to the upper opening of the canister shell, a ring-shaped shield is placed around the upper end portion of the canister.

The present invention is also intended for a residual stress improvement apparatus for improving residual stress in a canister in which fuel assemblies are loaded. A preferable residual stress improvement apparatus includes a water filler that, when a canister having a cylindrical canister shell and a canister lid welded to an upper opening of the canister shell is disposed in a cylindrical cask body, fills a space above and around an upper end portion of the canister in the cask body with fill water, and a compressive stress applicator that applies compressive stress to a predetermined region of the upper end portion of the canister in the fill water.

These and other objects, features, aspects and advantages of the present invention will become more apparent from the following detailed description of the present invention when taken in conjunction with the accompanying drawings.

DESCRIPTION OF EMBODIMENTS

Figure 1:
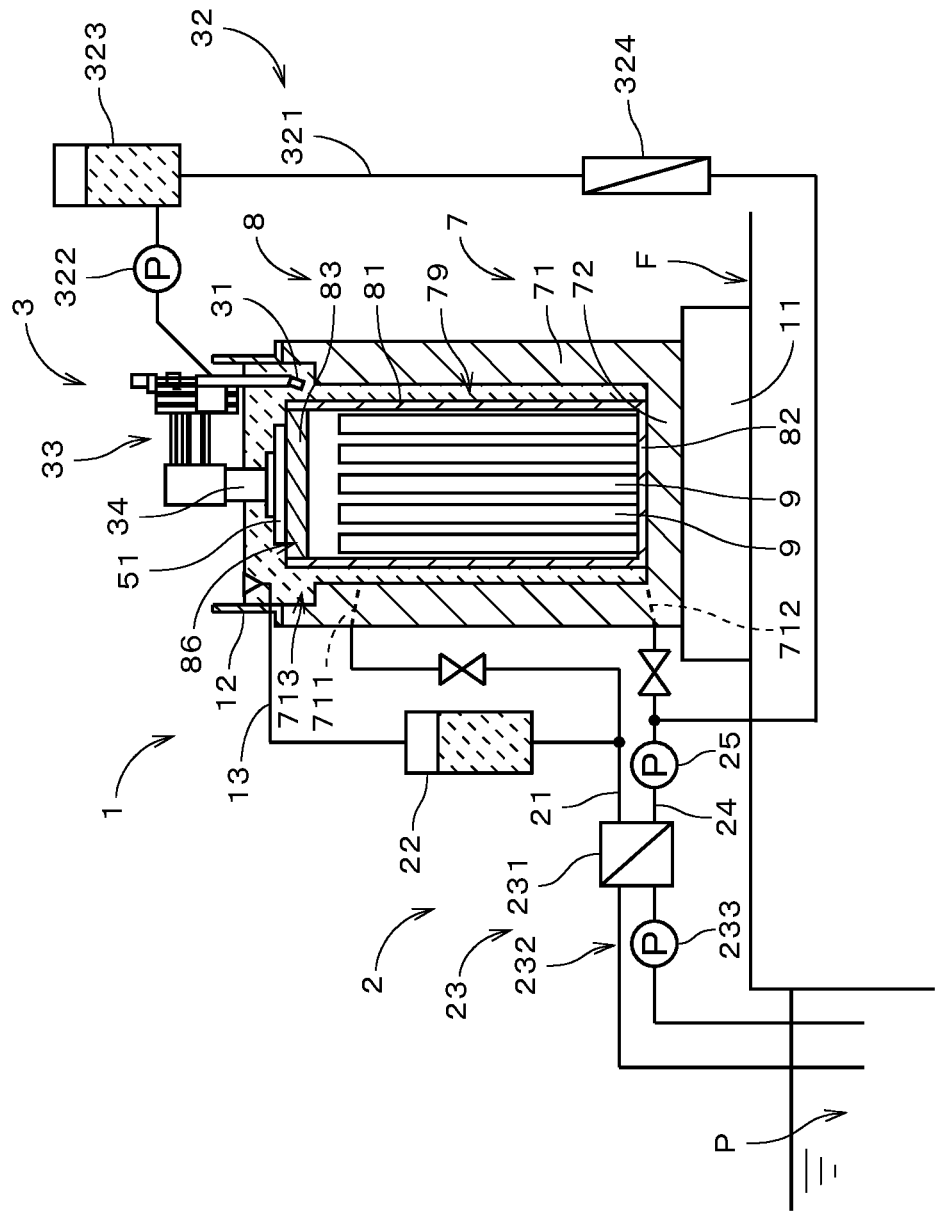
FIG. 1 is a diagram illustrating a configuration of a residual stress improvement apparatus.

FIG. 1 is a diagram illustrating a configuration of a residual stress improvement apparatus 1 according to one embodiment of the present invention. FIG. 1 shows a cross section including the central axes of a cask 7 and a canister 8, which will be described later (the same applies to the other drawings that illustrate the cask 7 and the canister 8). The residual stress improvement apparatus 1 is an apparatus for improving residual stress in the canister 8 in which fuel assemblies 9 are loaded. For example, the residual stress improvement apparatus 1 may be provided on an operation floor F (or in a decontamination pit or the like) located adjacent to a storage pool P in a nuclear reactor building. The storage pool P stores water, and the fuel assemblies 9 are immersed and stored in this water. The water in the storage pool P (hereinafter, referred to as "pooled water") is polluted water that contains radioactive materials.

The residual stress improvement apparatus 1 includes a cask holder 11, a ring-shaped weir 12, a water filler 2, and a compressive stress applicator 3. On the cask holder 11, a cask body 71 of the transport cask 7 is placed. The cask 7 may be formed of a neutron shielding material such as resin and metal, or may be formed of concrete or the like. The cask body 71 may be placed directly on the operation floor F. The cask body 71 has a cylindrical shape having a central axis pointing in the up-down direction in FIG. 1 as its center. In the example illustrated in FIG. 1, the cask body 71 has an approximately cylindrical shape. The cask body 71 may have any other shape such as a polygonal cylindrical shape. The upper and lower portions of the cask body 71 are provided respectively with an upper water hole 711 and a lower water hole 712. The upper water hole 711 and the lower water hole 712 penetrate through the side wall of the cask body 71. The upper water hole 711 and the lower water hole 712 allow the supply of water into the cask body 71 and the collection of water from the cask body 71.

The cask body 71 has a lower opening provided with an approximately disk-like cask bottom 72. The lower opening of the cask body 71 is closed by the cask bottom 72. The cask bottom 72 may be detachable from the cask body 71 and fixed attached by, for example, bolting to the cask body 71. Depending on the design of the cask 7, the cask bottom 72 may be formed integrally with the cask body 71. In the state illustrated in FIG. 1, the cask body 71 has an upper opening that is open. The upper opening of the cask body 71 is closed by the cask lid 73 that is fixedly attached by, for example, bolting to the upper opening through operations described later (see FIG. 8). The cask 7 primarily includes the cask body 71, the cask bottom 72, and the cask lid 73.

The canister 8 is disposed in the cask body 71. For example, the canister 8 may be formed of metal such as stainless steel, and a plurality of fuel assemblies 9 may be loaded in the canister 8. The canister 8 includes a canister shell 81, a canister bottom 82, and a canister lid 83. The canister shell 81 has a cylindrical shape having a central axis pointing in the up-down direction in FIG. 1 as its center. In the example illustrated in FIG. 1, the canister shell 81 has an approximately cylindrical shape. The canister shell 81 may have any other shape such as a polygonal cylindrical shape.

The canister shell 81 has a lower opening provided with an approximately disk-like canister bottom 82. The lower opening of the canister shell 81 is closed by the canister bottom 82.

Typically, the canister bottom 82 is welded and fixedly attached to the lower opening of the canister shell 81 before the fuel assemblies 9 are loaded in the canister shell 81. Before the fuel assemblies 9 are loaded in the canister shell 81, the canister shell 81 is also subjected to plastic working (the application of compressive stress) by shot peening or any other technique in order to improve, in advance, residual stress that is caused by the welding of the canister bottom 82. Here, the improvement of the residual stress refers to reducing residual tensile stress that is caused by welding (including the case of shifting the residual stress to the compressive side; the same applies below). Depending on the design, the canister bottom 82 may be formed integrally with the canister shell 81.

The canister shell 81 has an upper opening provided with an approximately disk-like canister lid 83. The upper opening of the canister shell 81 is closed by the canister lid 83. As will be described later, the canister lid 83 is welded and fixedly attached to the upper opening of the canister shell 81 after the fuel assemblies 9 are loaded in the canister shell 81. Besides, residual stress that is caused by the welding of the canister lid 83 is improved by processing of the residual stress improvement apparatus 1 described later. In the following description, the canister lid 83 and a portion of the canister shell 81 that is located in the vicinity of the canister lid 83 are collectively referred to as an "upper end portion 86." The upper end portion 86 includes a portion of the canister 8 in which residual tensile stress occurs when the canister lid 83 is welded to the upper opening of the canister shell 81.

In the example illustrated in FIG. 1, the canister 8 is disposed in the cask body 71 so that the central axis of the cylindrical cask body 71 overlaps approximately with the central axis of the cylindrical canister shell 81. The inside diameter of the cask body 71 is slightly greater than the outside diameter of the canister shell 81. Thus, an annular space 79 is formed between the inner peripheral surface of the cask body 71 and the outer peripheral surface of the canister 8 (the outer peripheral surface of the canister shell 81). The annular space 79 is provided appropriately along the entire length of the canister 8 in the up-down direction.

Figure 2:
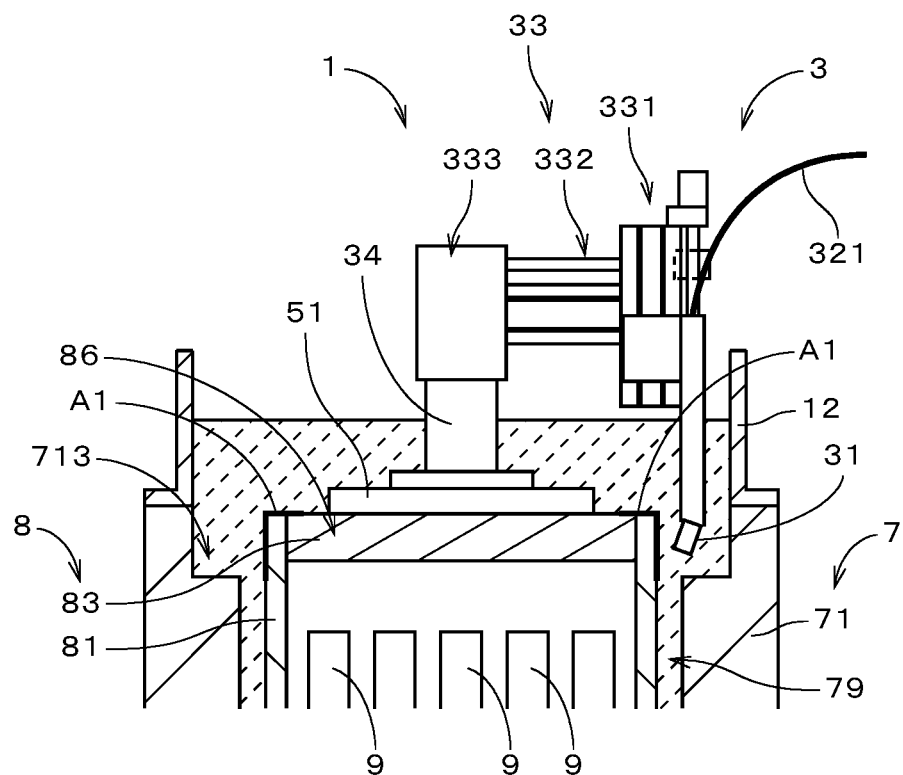
FIG. 2 is a diagram illustrating an area in the vicinity of the upper end portion of a canister.

FIG. 2 is a diagram illustrating an area in the vicinity of the upper end portion 86 of the canister 8. As illustrated in FIG. 2, the inside diameter of the upper end portion of the cask body 71 is greater than the inside diameter thereof at the other positions such as the central portion in the up-down direction. In other words, the inner peripheral surface of the upper end portion of the cask body 71 has a ring-shaped notch 713 extending along the entire perimeter of the cask body 71 (the entire perimeter in a circumferential direction having the central axis of the cask body 71 as its center). The ring-shaped notch 713 faces the upper end portion 86 of the canister 8 in a radial direction having the central axis of the cask body 71 as its center. Thus, the width of the annular space 79 around the upper end portion 86 of the canister 8 is greater than the width of the annular space 79 around the other portions of the canister 8 such as the central portion.

The ring-shaped weir 12 has a cylindrical shape and, in the example illustrated in FIG. 2, has an approximately cylindrical shape like the cask body 71. The ring-shaped weir 12 is attached to the upper portion of the cask body 71 and projects upward from this upper portion. Preferably, the ring-shaped weir 12 may be fixedly attached to the upper end face of the cask body 71 by bolting using bolt holes that are used to fixedly attach the cask lid 73 (see FIG. 8) to the cask body 71. The bottom face of the ring-shaped weir 12 is provided with a ring-shaped seal member (not shown) in order to disable the passage of fluid between the bottom face of the ring-shaped weir 12 and the upper end face of the cask body 71. Alternatively, the ring-shaped weir 12 may be attached to a face other than the upper end face in the upper portion of the cask body 71. In the example illustrated in FIG. 2, the upper end face of the cask body 71 is located at approximately the same level as the upper face of the canister lid 83 (i.e., the upper end face of the canister 8) or slightly above the upper face of the canister lid 83. The upper end of the ring-shaped weir 12 is located sufficiently above the upper face of the canister lid 83.

As illustrated in FIG. 1, the water filler 2 includes an outflow line 21, a clean water tank 22, a heat exchanger 23, an inflow line 24, and a conveying pump 25. The outflow line 21 connects the heat exchanger 23 and the upper water hole 711 of the cask body 71. The heat exchanger 23 will be described later. The outflow line 21 is provided with a valve. The clean water tank 22 stores clean water, i.e., water that contains no radioactive materials. The clean water may, for example, be deionized water. The clean water tank 22 is connected to the outflow line 21. The inflow line 24 connects the heat exchanger 23 and the lower water hole 712 of the cask body 71. The inflow line 24 is provided with the conveying pump 25 and a valve.

The water filler 2 is capable of driving the conveying pump 25 and supplying the clean water stored in the clean water tank 22 to the annular space 79 of the cask body 71 via the outflow line 21, the heat exchanger 23, the inflow line 24, and the lower water hole 712. In the state illustrated in FIG. 1, the aforementioned annular space 79 is filled with the clean water. The space above the upper end portion 86 of the canister 8 is also filled with the clean water, so that the surface of the clean water is formed in the ring-shaped weir 12. The ring-shaped weir 12 is provided with an overflow tube 13, and when the surface of the clean water in the ring-shaped weir 12 becomes higher than a discharge port of the overflow tube 13, the clean water is discharged via the overflow tube 13 to the clean water tank 22. In FIG. 1, the spaces filled with the clean water are hatched with broken lines, and the pooled water in the storage pool P is not hatched in order to distinguish between the clean water that contains no radioactive materials and the pooled water that contains radioactive materials (the same applies to the other drawings). In the following description, the water that fills the interiors of the cask body 71 and the ring-shaped weir 12 (i.e., the water that fills the annular space 79 and the space above the upper end portion 86 of the canister 8) is referred to as "fill water."

With the annular space 79 filled with the clean water, the water filler 2 drives the conveying pump 25 so that the clean water (i.e., fill water) in the annular space 79 flows out through the upper water hole 711 to the outflow line 21 and conveyed to the heat exchanger 23. The clean water that has passed through the heat exchanger 23 flows into (returns to) the annular space 79 through the inflow line 24 and the lower water hole 712. In this way, the water filler 2 is capable of circulating the clean water along a circulation path that starts from the annular space 79, passes through the upper water hole 711, the outflow line 21, the heat exchanger 23, the inflow line 24, and the lower water hole 712 in sequence, and returns to the annular space 79.

The heat exchanger 23 includes a heat exchange part 231 and a pooled water circulator 232. The pooled water circulator 232 includes a pump 233 and circulates the pooled water between the storage pool P and the heat exchange part 231. The heat exchange part 231 exchanges heat between the clean water that flows in from the outflow line 21 and the pooled water that is circulated by the pooled water circulator 232. In the present embodiment, since the fuel assemblies 9 in the canister 8 have high heat values, the heat exchanger 23 cools the clean water flowing in from the outflow line 21 with the pooled water. When the fuel assemblies 9 have low heat values, the cooling by the heat exchanger 23 (heat exchange between the clean water in the annular space 79 and the pooled water) may be omitted.

As illustrated in FIGS. 1 and 2, the compressive stress applicator 3 includes a nozzle 31, a water supplier 32, a nozzle mover 33, and a supporter 34. The nozzle 31 is disposed in the fill water inside the cask body 71 and the ring-shaped weir 12. The water supplier 32 illustrated in FIG. 1 includes a supply line 321, a pump 322, a supply tank 323, and a filter 324. One end of the supply line 321 is connected to the nozzle 31, and the other end thereof is connected to the inflow line 24. In the supply line 321, the filter 324, the supply tank 323, and the pump 322 are arranged in the order specified from the inflow line 24 toward the nozzle 31. Part of the clean water flowing in the inflow line 24 flows into the supply tank 323 after unnecessary substances are removed by the filter 324. The supply tank 323 stores the clean water. The pump 322 increases the pressure of the clean water in the supply tank 323 and supplies the clean water to the nozzle 31. Accordingly, high pressure water is sprayed from the nozzle 31 in the fill water.

As illustrated in FIG. 2, the supporter 34 is fixedly attached to the upper face of the canister lid 83. For example, the upper face of the canister lid 83 may be fixedly attached to a shield plate 51, and the supporter 34 may be attached to the shield plate 51. For example, the shield plate 51 may have an approximately disk-like shape and may be formed of a material that shields radioactive rays. The nozzle mover 33 includes a first movement mechanism 331, a second movement mechanism 332, and a third movement mechanism 333. The first movement mechanism 331 moves the nozzle 31 in the up-down direction. The second movement mechanism 332 moves the nozzle 31 together with the first movement mechanism 331 in the radial direction. The third movement mechanism 333 is supported by the supporter 34 and moves (turns) the nozzle 31 together with the first and second movement mechanisms 331 and 332 in the circumferential direction.

Figure 3:
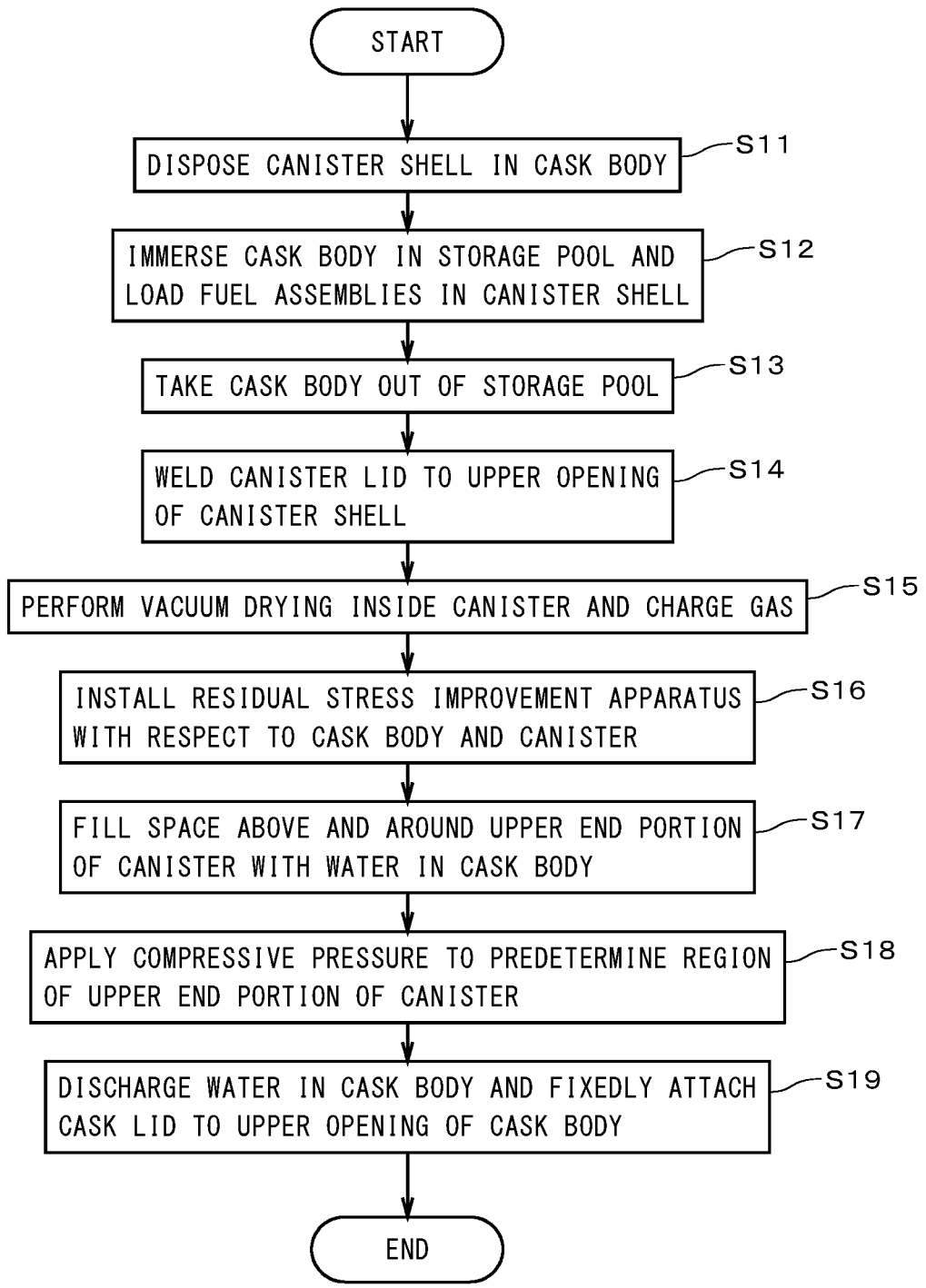
FIG. 3 is a flowchart of processing relating to the loading of fuel assemblies into the canister.
Figure 4:
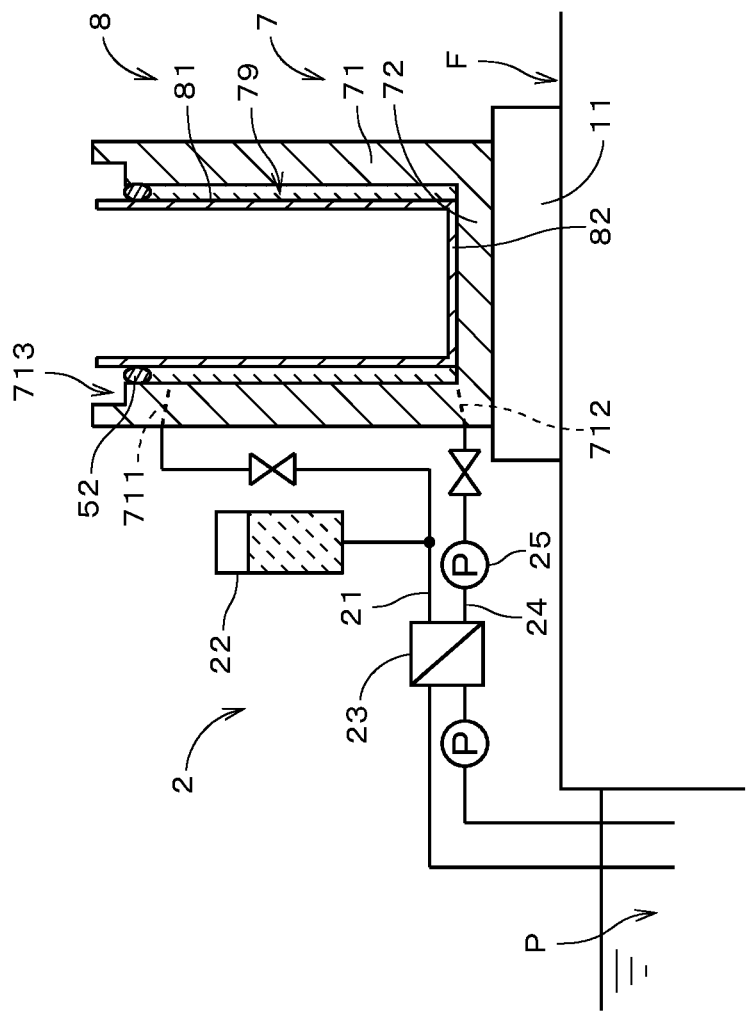
FIG. 4 is a diagram for describing the processing relating to the loading of fuel assemblies into the canister.

FIG. 3 is a flowchart of processing relating to the loading of the fuel assemblies 9 into the canister 8. First, as illustrated in FIG. 4, the cask body 71 is placed on the cask holder 11 on the operation floor F, and the canister shell 81 is disposed in the cask body 71 (step S11). The cask body 71 has a lower opening that is closed by the cask bottom 72 and an upper opening that is open. The canister shell 81 has a lower opening that is closed by the canister bottom 82 and an upper opening that is open.

Moreover, a ring-shaped seal member 52 (e.g., inflatable seal) is provided between the inner peripheral surface of the cask body 71 and the outer peripheral surface of the canister shell 81. For example, the seal member 52 may be arranged in the vicinity of the underside of the ring-shaped notch 713. This disables the passage of fluid between the seal member 52 and the inner peripheral surface of the cask body 71 and between the seal member 52 and the outer peripheral surface of the canister shell 81. The cask body 71 is also connected to the water filler 2 described previously. When the water filler 2 drives the conveying pump 25, the portion of the annular space 79 in the cask body 71 which is located below the seal member 52 is filled with the clean water in the clean water tank 22.

Figure 5:
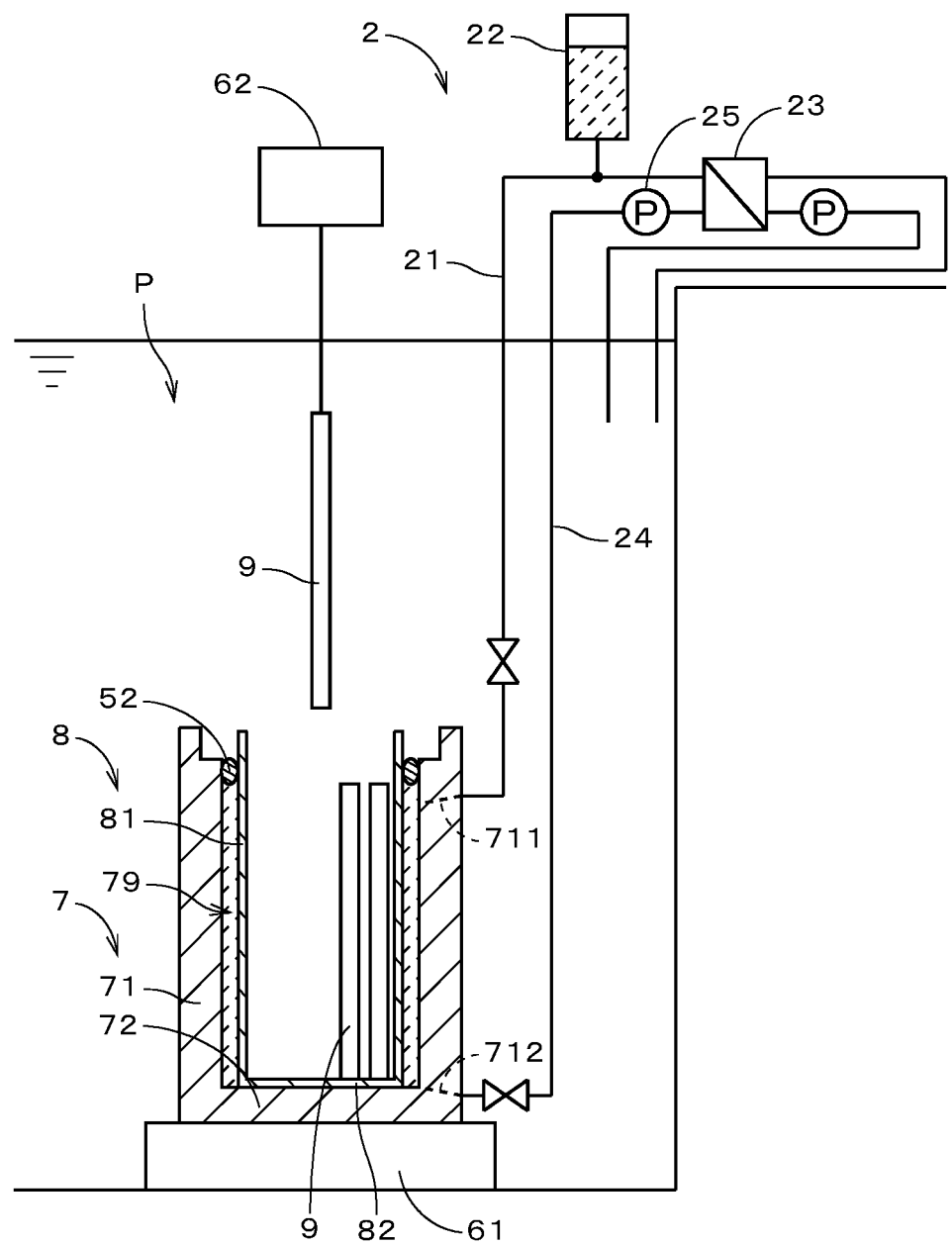
FIG. 5 is a diagram for describing the processing relating to the loading of fuel assemblies into the canister.

Then, as illustrated in FIG. 5, the cask body 71 is immersed together with the canister shell 81 in the storage pool P, using an overhead travelling crane or the like provided in a nuclear reactor building. For example, the cask body 71 may be disposed on a cask holder 61 provided at the bottom of the storage pool P. For convenience of illustration, the positions of the upper water hole 711, the lower water hole 712, and the water filler 2 relative to the cask body 71 in FIG. 5 are reversed right to left from those in FIG. 4. Thereafter, the fuel assemblies 9 stored in the storage pool P are transported (inserted) into the canister shell 81 and loaded therein by a fuel exchanging machine 62 (step S12).

Figure 6:
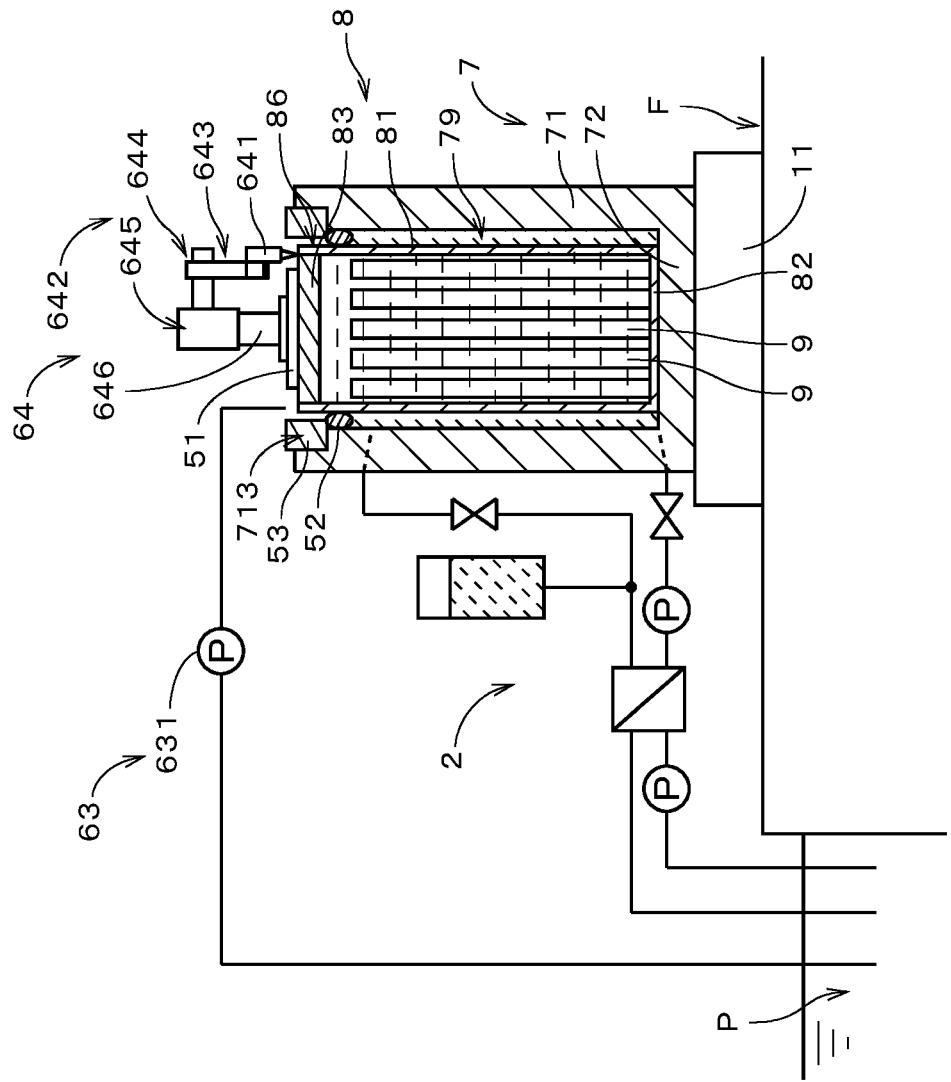
FIG. 6 is a diagram for describing the processing relating to the loading of fuel assemblies into the canister.

When a predetermined number of fuel assemblies 9 has been loaded in the canister shell 81, the canister lid 83 is fitted in the upper opening of the canister shell 81 in the storage pool P (see FIG. 6). Thereafter, the cask body 71 is taken out of the storage pool P, together with the canister shell 81 (step S13). In the water filler 2, the clean water is continuously circulated between the annular space 79 and the heat exchanger 23 so as to reduce the possibility that the temperature inside the canister shell 81 may be excessively increased outside the storage pool P by the heat generated by the fuel assemblies 9 in the canister shell 81.

The cask body 71 taken out of the storage pool P may be subjected to, for example, decontamination of the outer surface in a decontamination pit and thereafter placed on the cask holder 11 on the operation floor F as illustrated in FIG. 6. In FIG. 6, the canister 8 filled with the pooled water is hatched with a different pattern from that of the annular space 79 filled with the clean water. Then, the pooled water that is accumulated above the canister lid 83 and in a portion of the annular space 79 located above the seal member 52 is removed by a drainage system 63 that includes a pump 631. Moreover, for example, the upper face of the canister lid 83 may be decontaminated as necessary. The removal of the pooled water and the decontamination of, for example, the canister lid 83 described above may be performed in a decontamination pit.

Moreover, the shield plate 51 described previously is fixedly attached to the upper face of the canister lid 83, and the ring-shaped shield 53 is fitted in the ring-shaped notch 713. Like the shield plate 51, the ring-shaped shield 53 is formed of a material that shields radioactive rays. The outside diameter of the ring-shaped shield 53 is slightly smaller than the inside diameter of the cask body 71 at the position of the ring-shaped notch 713. For example, the inside diameter of the ring-shaped shield 53 may be approximately the same as or slightly smaller than the inside diameter of the cask body 71 at the positions other than the ring-shaped notch 713. In the state illustrated in FIG. 6, radioactive rays (e.g., neutrons) emitted from the fuel assemblies 9 are shielded by the clean water that fills the portion of the annular space 79 that is located below the seal member 52. In the case where the ring-shaped shield 53 is attached to the ring-shaped notch 713, the range of the canister shell 81 that can shield radioactive rays is equivalent to or more than that in the case where the ring-shaped notch 713 is not provided.

After the attachment of the shield plate 51 and the ring-shaped shield 53, welding equipment 64 is attached to the canister lid 83. For example, the welding equipment 64 illustrated in FIG. 6 may be laser welding equipment and include a welding head 641, a head mover 642, and a supporter 646. The welding head 641 emits laser light. The head mover 642 and the supporter 646 are similar to the nozzle mover 33 and the supporter 34 of the compressive stress applicator 3 illustrated in FIG. 2. The supporter 646 is fixedly attached to the canister lid 83 via the shield plate 51. The head mover 642 includes a first movement mechanism 643, a second movement mechanism 644, and a third movement mechanism 645. The first movement mechanism 643 moves the welding head 641 in the up-down direction. The second movement mechanism 644 moves the welding head 641 together with the first movement mechanism 643 in the radial direction. The third movement mechanism 645 is supported by the supporter 646 and moves (turns) the welding head 641 together with the first and second movement mechanisms 643 and 644 in the circumferential direction.

In the welding equipment 64, the welding head 641 that is emitting laser light is moved by the heat mover 642. Specifically, the position that is to be irradiated with the laser light emitted from the welding head 641 shifts along the outer peripheral edge of the canister lid 83. Accordingly, the outer peripheral edge of the canister lid 83 and the edge of the upper opening of the canister shell 81 are welded together along the entire perimeter. That is, the canister lid 83 is welded to the upper opening of the canister shell 81 (step S14). Preferably, the canister 8 may be provided with a ring-shaped notch that extends along the outer peripheral edge of the upper face of the canister lid 83, and a ring-shaped member may be fitted in this notch after the welding of the canister lid 83. Then, the ring-shaped member is welded to the canister lid 83 and the canister shell 81 by the welding equipment 64. The welding method used by the welding equipment 64 may be other than laser welding (e.g., arc welding).

Note that part of the pooled water may be discharged from the inside of the canister 8 before the welding of the canister lid 83. For example, the canister lid 83 may be provided with a plurality of ports 831 (see FIG. 7 described later), and these ports 831 may be used to discharge part of the pooled water and to supply an inert gas into the canister 8. This reduces the influence of water vapor during welding. For example, the shield plate 51 may be provided with openable and closable holes at positions that face the ports 831 of the canister lid 83, and these holes may be used to connect various tubes to the ports 831. After the welding of the canister lid 83, the soundness of the welds is preferably checked by conducting a predetermined test or inspection. The same applies to the welding of the ring-shaped member and the welding of port covers described later.

Figure 7:
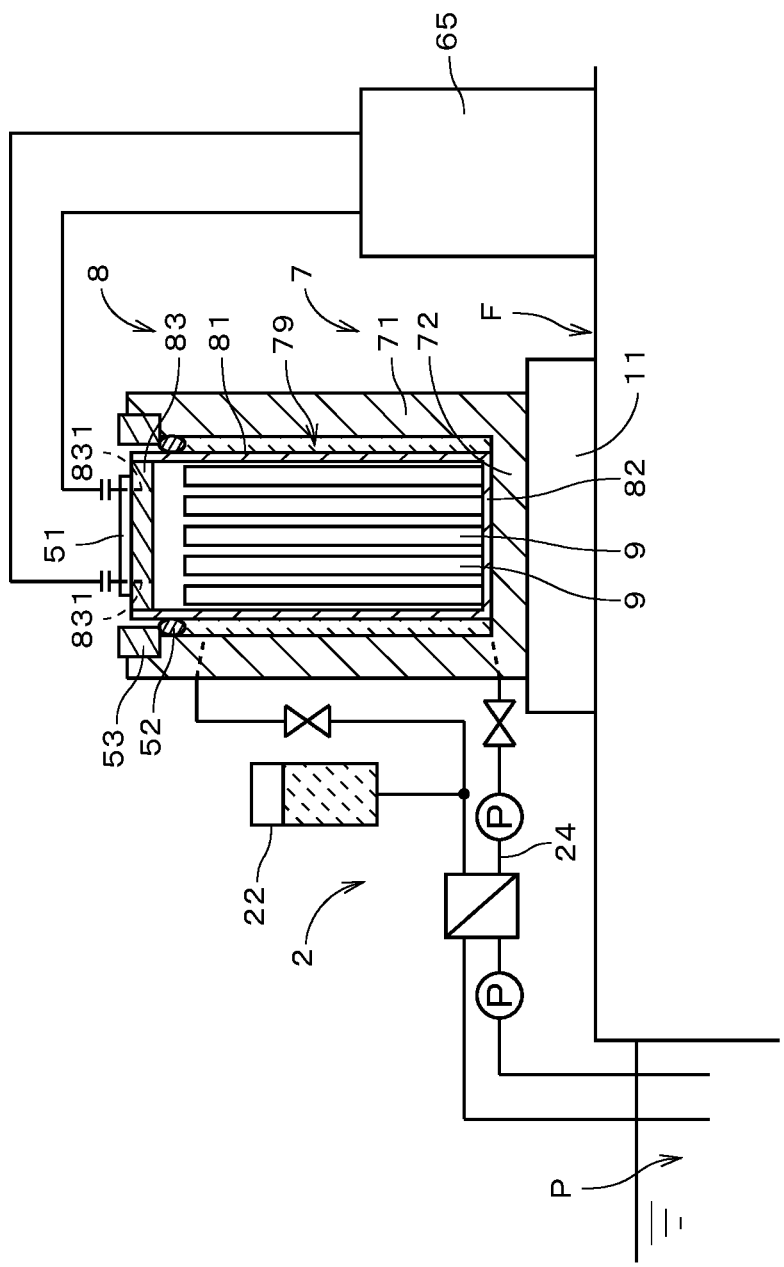
FIG. 7 is a diagram for describing the processing relating to the loading of fuel assemblies into the canister.

When the welding of the canister lid 83 (and the ring-shaped member) is completed, the welding equipment 64 is dismounted from the canister lid 83. Then, all the pooled water in the canister 8 is discharged through the ports 831. After the discharge of the pooled water, connecting tubes of a vacuum drier 65 are connected to the ports 831 of the canister lid 83 as illustrated in FIG. 7, and vacuum drying is performed in the canister 8. When the vacuum drying in the canister 8 is completed, gas supply tubes are connected to the ports 831, and a predetermined gas (e.g., helium (He) gas) is charged into the canister 8 (step S15). Preferably, port covers may be welded to the ports 831 of the canister 8 after charging of the gas. In this case, the welding equipment 64 is dismounted from the canister lid 83 after the welding of the port covers is completed.

Then, as illustrated in FIG. 1, the residual stress improvement apparatus 1 is installed with respect to the cask body 71 and the canister 8 (step S16). At this time, the water filler 2 has already been attached to the cask body 71 (before the cask body 71 is immersed in the storage pool P) as illustrated in FIG. 7. Thus, the installation of the residual stress improvement apparatus 1 includes attaching the ring-shaped weir 12, the overflow tube 13, and the compressive stress applicator 3 to the cask body 71 and the canister 8.

Specifically, the ring-shaped shield 53 is dismounted, and the ring-shaped weir 12 is attached to the upper portion of the cask body 71. Moreover, both ends of the overflow tube 13 are connected respectively to the ring-shaped weir 12 and the clean water tank 22. In the compressive stress applicator 3, the supporter 34 that supports the nozzle 31 and the nozzle mover 33 is fixedly attached to the canister lid 83 via the shield plate 51. One end of the supply line 321 of the water supplier 32 (the end on the side opposite the nozzle 31) is connected to the inflow line 24. Through the operations described above, the installation of the residual stress improvement apparatus 1 is completed. Alternatively, the shield plate 51 may be dismounted from the canister lid 83, and the supporter 34 may be fixedly attached directly to the canister lid 83.

In the present example of processing, after the removal of the seal member 52 between the inner peripheral surface of the cask body 71 and the outer peripheral surface of the canister 8, the water filler 2 further supplies the clean water stored in the clean water tank 22 to the interior of the cask body 71 via the inflow line 24. Accordingly, the portion of the annular space 79 that is located above the position of the seal member 52 is also filled with the clean water, and the surface of the clean water is formed in the vicinity of the discharge port of the overflow tube 13 in the ring-shaped weir 12 as illustrated in FIG. 1. That is, the space above and around the upper end portion 86 of the canister 8 is also filled with the clean water in the cask body 71 and the ring-shaped weir 12 (step S17).

The clean water that fills the space above and around the upper end portion 86 of the canister 8 shields radioactive rays that are emitted from the fuel assemblies 9 and coming upward.

In order to allow the layer of the clean water that is located above the upper end portion 86 to have a certain degree of capability to shield the radioactive rays, the layer of the clean water has a thickness (i.e., distance from the upper face of the canister lid 83 to the surface of the clean water) of, for example, 10 cm or more, preferably 30 cm or more, and more preferably 50 cm or more.

In the compressive stress applicator 3, the nozzle 31 is disposed in the clean water in the ring-shaped weir 12 and the cask body 71, i.e., in the fill water. For example, the nozzle 31 may have a spray outlet that faces the outer surface (the outer peripheral surface or the upper face) of the upper end portion 86 of the canister 8. When the pump 322 of the water supplier 32 is driven, high pressure water is sprayed from the nozzle 31 toward the outer surface of the upper end portion 86 in the fill water. Accordingly, cavitation occurs in the fill water, and impact pressure that occurs upon collapse of air bubbles causes plastic deformation of a region of the outer surface of the upper end portion 86 that approximately faces the spray outlet of the nozzle 31. That is, compressive stress is applied to this region of the canister 8 by water-jet peening.

In the compressive stress applicator 3, the nozzle 31 that is spraying high pressure water is moved by the nozzle mover 33. Specifically, the nozzle 31 sprays high pressure water in succession to approximately the entire region of the outer peripheral surface of the upper end portion 86 of the canister 8 and to the region of the upper face of the upper end portion 86 that is located outside the vicinity of the outer peripheral edge of the canister lid 83 (hereinafter, these regions are collectively referred to as "target regions"). In FIG. 2 that illustrates a cross section of the canister 8, the target regions of the outer surface of the upper end portion 86 are indicated by thick solid lines affixed with reference signs A1. The entire target regions are located in the fill water. In this way, compressive stress is applied to the target regions of the upper end portion 86 of the canister 8, and residual tensile stress caused by the welding is reduced (step S18). Steps S17 and S18 described above correspond to residual stress improvement processing for improving residual stress in the canister 8. In the residual stress improvement processing, it is preferable that residual stress is shifted from the tensile side to the compressive side.

As described previously, the presence of the ring-shaped notch 713 of the cask body 71 allows the width of the annular space 79 around the upper end portion 86 of the canister 8 to become greater than the width of the annular space 79 around the other portions of the canister 8 such as the central portion. This makes it possible to dispose the nozzle 31 at the position facing the outer peripheral surface of the upper end portion 86 and to readily apply compressive stress to the outer peripheral surface. The residual stress improvement apparatus 1 may include a plurality of nozzles 31 in order to complete the application of compressive stress to the target regions in a short time. The target regions to which compressive stress is applied may be changed appropriately.

While the compressive stress applicator 3 applies compressive stress to the upper end portion 86, the water filler 2 in FIG. 1 continuously circulates the clean water along the circulation path that starts from the annular space 79, passes in sequence through the upper water hole 711, the outflow line 21, the heat exchanger 23, the inflow line 24, and the lower water hole 712, and returns to the annular space 79. This reduces the possibility that the temperature in the canister 8 may be increased excessively. Alternatively, the valves of the outflow line 21 and the inflow line 24 may be closed so that the clean water is circuited along a circulation path that starts from the interior of the cask body 71 (and the interior of the ring-shaped weir 12), passes in sequence through the overflow tube 13, the clean water tank 22, the outflow line 21, the heat exchanger 23, the inflow line 24, the supply line 321, and the nozzle 31, and returns to the interior of the cask body 71 (while high pressure water is being sprayed from the nozzle 31).

Since the supply line 321 of the water supplier 32 is connected to the flow path of the clean water flowing out of the annular space 79 (in FIG. 1, the inflow line 24), the clean water whose temperature is increased by the heat generated by the fuel assemblies 9 in the canister 8 is supplied to the nozzle 31. During water-jet peening, cavitation is likely to occur at temperatures higher than ordinary temperature (e.g., 40 to 60° C.). Therefore, the compressive stress applicator 3 that sprays the water heated in the annular space 79 from the nozzle 31 becomes capable of applying compressive stress to the upper end portion 86 of the canister 8 more efficiently than in the case of using ordinary-temperature water. Depending on the heat values of the fuel assemblies 9 or other features, the supply line 321 of the water supplier 32 may be connected to the outflow line 21 so as to allow the clean water before passing through the heat exchange part 231 to flow into the supply line 321. As another alternative, the supply tank 323 may include a heat regulator that controls the temperature of the clean water.

When the application of compressive stress to the upper end portion 86 of the canister 8 is completed, the water filler 2 stops to drive the pump 25. Also, the clean water in the interiors of the cask body 71 and the ring-shaped weir 12 is discharged through, for example, the lower water hole 712. Alternatively, the cask bottom 72 may have an openable and closable opening, and the clean water in the interiors may be discharged through this opening. When the discharge of the clean water in the interiors is completed, the water filler 2, the ring-shaped weir 12, the overflow tube 13, and the compressive stress applicator 3 are dismounted from the cask body 71 and the canister 8. The shield plate 51 is also removed from the canister lid 83.

Figure 8:
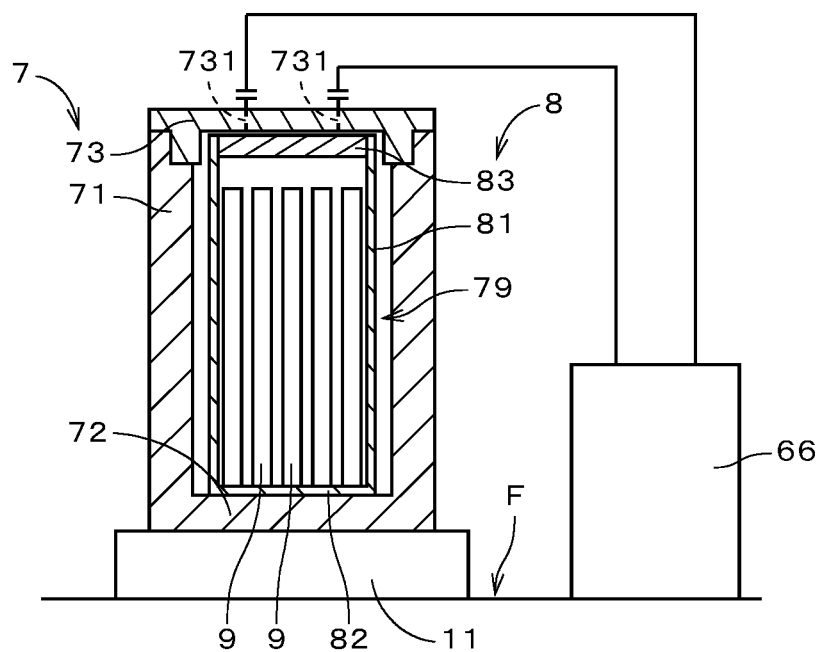
FIG. 8 is a diagram for describing the processing relating to the loading of fuel assemblies into the canister.

Then, as illustrated in FIG. 8. the cask lid 73 is fixedly attached to the upper opening of the cask body 71 by, for example, bolting so as to close the upper opening (step S19). This configures the cask 7 that serves as a closed container that houses the canister 8. In the example illustrated in FIG. 8, connecting tubes of a vacuum driver 66 are connected to the ports 731 of the cask lid 73, and vacuum drying is performed in the cask 7. When the vacuum drying in the cask 7 is completed, gas supply tubes are connected to the ports 731 so that the cask 7 is filled with a predetermined gas (e.g., helium (He) gas). The vacuum drying and the application of the gas in the cask 7 may be omitted. Through the operations described above, the processing relating to the loading of the fuel assemblies 9 into the canister 8 is completed. The canister 8 that is housed in the cask 7 is transported to the storage facility.

As described above, in the method of improving residual stress in the canister 8, when the canister 8 having the canister shell 81 and the canister lid 83 welded to the upper opening of the canister shell 81 is disposed in the cask body 71 (see FIG. 1), the space above and around the upper end portion 86 of the canister 8 in the cask body 71 is filled with fill water. Then, water is sprayed from the nozzle 31 disposed in the fill water to apply compressive stress by water-jet peening to a predetermined region of the upper end portion 86 of the canister 8. This makes it possible to readily apply compressive stress to the canister 8 while shielding radioactive rays by the fill water. As a result, it is possible to prevent or suppress stress-corrosion cracking in the canister 8. The water-jet peening can also suppress the generation of unnecessary substances during the application of compressive stress.

In the residual stress improvement method, the ring-shaped weir 12 is attached to the upper portion of the cask body 71 to project upward therefrom, and the surface of water is formed in the ring-shaped weir 12. This makes it possible to readily fill the space above the upper end portion 86 of the canister 8 with water. Besides, it is possible to readily increase the thickness of the layer of water that fills the space above the upper end portion 86 and thereby to further improve the capability to shield radioactive rays that are emitted from the fuel assemblies 9 and coming upward. In the case where the upper end of the cask body 71 is located to some extent above the upper face of the canister lid 83, the ring-shaped weir 12 may be omitted.

The annular space 79 is formed between the inner peripheral surface of the cask body 71 and the outer peripheral surface of the canister 8, and the annular space 79 is filled with water. Thus, the water that fills the annular space 79 can also be used to shield the radioactive rays emitted from the fuel assemblies 9. In the application of compressive stress to the upper end portion 86 of the canister 8, the water sprayed from the nozzle 31 includes the water that has filled the annular space 79. Accordingly, it is possible to spray water with a favorable temperature from the nozzle 31 using the heat generated by the fuel assemblies 9 and to improve the efficiency of applying compressive stress. Depending on the design, the water supplier 32 may be provided independently of the circulation path of water including the annular space 79, and water that does not pass through the annular space 79 may be supplied to the nozzle 31.

Preferably, the width of the annular space 79 around the upper end portion 86 of the canister 8 is greater than the width of the annular space 79 around the central portion of the canister 8. In this way, the presence of the space in which the nozzle 31 can be disposed between the outer peripheral surface of the upper end portion 86 and the inner peripheral surface of the cask body 71 makes it possible to readily apply compressive stress to the outer peripheral surface of the upper end portion 86. Moreover, when the canister lid 83 is welded to the upper opening of the canister shell 81, the ring-shaped shield 53 is provided around the upper end portion 86 of the canister 8 (see FIG. 6). As a result, it is possible to suppress leakage of radioactive rays from the aforementioned space between the upper end portion 86 and the cask body 71 during the welding of the canister lid 83. Depending on the design of the cask 7, the ring-shaped notch 713 may be omitted, and the width of the annular space 79 may be made constant along the entire length in the up-down direction.

The residual stress improvement method and the residual stress improvement apparatus 1 described above may be modified in various ways.

Although in the embodiment described above, water-jet peening is used to apply compressive stress to the upper end portion 86 of the canister 8, any other technique may be used to apply compressive stress to the upper end portion 86 in the fill water. For example, in the case where laser peening is adopted, laser light is emitted from a head disposed in the fill water toward the upper end portion 86 of the canister 8. In this case, it is also possible to suppress the generation of unnecessary substances during the application of compressive stress as in the case of using water-jet peening. If the contamination of water around the upper end portion 86 does not become a problem, other techniques may be adopted, such as banishing using a ball or a roller.

The annular space 79 formed between the inner peripheral surface of the cask body 71 and the outer peripheral surface of the canister 8 may be filled with water (e.g., pooled water) other than clean water. The same applies to the water that fills the space above and around the upper end portion 86 of the canister 8 in step S17 in FIG. 3 and the water that is sprayed from the nozzle 31 in step S18. On the other hand, in order to save work of decontaminating the inner peripheral surface of the cask body 71 and the outer surface of the canister 8, it is preferable that the annular space 79 is filled with clean water that contains no radioactive materials as in the embodiment described above. Similarly, it is preferable that the water that fills the space above and around the upper end portion 86 of the canister 8 in step S17 and the water sprayed from the nozzle 31 in step S18 may be clean water.

In the example of processing described above, when the space above and around the upper end portion 86 of the canister 8 is filled with clean water, the seal member 52 provided between the inner peripheral surface of the cask body 71 and the outer peripheral surface of the canister 8 is removed. However, in the presence of the seal member 52, the space above and around the upper end portion 86 of the canister 8 may be filled with clean water, using, for example, the nozzle 31. As described previously, in the case where the fuel assemblies 9 have low heat values, the portion of the annular space 79 that is located below the seal member 52 does not necessarily have to be filled with water, and in this case, only the space above the seal member 52, i.e., the space above and around the upper end portion 86 of the canister 8, may be filled with clean water in step S17. In the case where the aforementioned portion of the annular space 79 is not filled with water, it is preferable that the pressure in this portion is set to be higher than or equal to a predetermined value. Moreover, the gas (e.g., air) that fills the aforementioned portion may be cooled by heat exchange performed by the heat exchanger 23.

The configurations of the above-described preferred embodiments and variations may be appropriately combined as long as there are no mutual inconsistencies.

While the invention has been shown and described in detail, the foregoing description is in all aspects illustrative and not restrictive. It is therefore to be understood that numerous modifications and variations can be devised without departing from the scope of the invention.

REFERENCE SIGNS LIST

1 Residual stress improvement apparatus
2 Water filler
3 Compressive stress applicator
8 Canister
9 Fuel assembly
12 Ring-shaped weir
31 Nozzle
53 Ring-shaped shield
71 Cask body
79 Annular space
81 Canister shell
83 Canister lid
86 Upper end portion of (canister)
S11 to S19 Step

The invention claimed is:

1. A residual stress improvement method of improving residual stress in a canister in which a fuel assembly is loaded, the residual stress improvement method comprising:
   a) disposing a cylindrical canister shell in a cylindrical cask body to form an annular space between an inner peripheral surface of said cask body and an outer peripheral surface of the canister shell, and providing a ring-shaped seal member in said annular space, said canister shell having a lower opening that is closed, said cask body having a lower opening that is closed;
   b) filling with clean water a portion of said annular space that is located below said seal member;
   c) immersing said cask body together with said canister shell in a storage pool to load the fuel assembly in said canister shell;
   d) fitting a canister lid in an upper opening of said canister shell in said storage pool, and taking said cask body out of said storage pool together with said canister shell;
   e) decontaminating said cask body;
   f) welding said canister lid to said upper opening of said canister shell;
   g) filling with fill water a space above and around an upper end portion of said canister in said cask body, said canister including said canister shell and said canister lid; and
   h) applying compressive stress to a predetermined region of said upper end portion of said canister in the fill water.

2. The residual stress improvement method according to claim 1, wherein in said operation h), water-jet peening is used to apply compressive stress to said predetermined region, the water-jet peening being performed by injecting water from a nozzle that is disposed in the fill water.

3. The residual stress improvement method according to claim 2, wherein
   in said operation h), said seal member is removed from said annular space, and the water injected from said nozzle includes the water that has filled said annular space and whose temperature has been increased by heat generated by said fuel assembly in said canister.

4. The residual stress improvement method according to claim 2, wherein the fill water in said operation g) and the water injected from said nozzle in said operation h) are clean water that contains no radioactive materials.

5. The residual stress improvement method according to claim 1, wherein
   in said operation g), a surface of water is formed in a ring-shaped weir that is attached to an upper portion of said cask body and projects upward therefrom.

6. The residual stress improvement method according to claim 1, wherein a width of said annular space around said upper end portion of said canister is greater than a width of said annular space around a central portion of said canister, and
   wherein, in said operation f), when said canister lid is welded to said upper opening of said canister shell, a ring-shaped shield is placed around said upper end portion of said canister.

* * * * *